US008967486B2

(12) United States Patent
Chandramowle et al.

(10) Patent No.: US 8,967,486 B2
(45) Date of Patent: Mar. 3, 2015

(54) RADIO FREQUENCY ID TAG HAVING STRUCTURE FOR INLAY SPACING

(75) Inventors: Gopal Chandramowle, Boca Raton, FL (US); Edward Day, Pembroke Pines, FL (US); Hubert A. Patterson, Boca Raton, FL (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 275 days.

(21) Appl. No.: 13/546,476

(22) Filed: Jul. 11, 2012

(65) Prior Publication Data

US 2013/0146668 A1 Jun. 13, 2013

Related U.S. Application Data

(60) Provisional application No. 61/630,494, filed on Dec. 13, 2011.

(51) Int. Cl.
*G06K 19/06* (2006.01)

(52) U.S. Cl.
USPC ........................................... 235/492; 235/487

(58) Field of Classification Search
USPC ............. 235/487, 492; 340/572.8, 693.5, 693
See application file for complete search history.

(56) References Cited

U.S. PATENT DOCUMENTS

| 4,642,640 | A |   | 2/1987  | Woolsey |             |
|-----------|---|---|---------|---------|-------------|
| 5,986,562 | A | * | 11/1999 | Nikolich | .... 340/693.5 |
| 6,121,878 | A |   | 9/2000  | Brady   |             |
| 7,724,146 | B2| * | 5/2010  | Nguyen et al. | ..... 340/572.8 |
| 8,178,853 | B2| * | 5/2012  | Yoder   | .......... 250/482.1 |
| 2005/0270161 | A1 |   | 12/2005 | Yang |       |

OTHER PUBLICATIONS

EPO International Search Report dated Oct. 5, 2012 for corresponding appln PCT/US12/046519.

* cited by examiner

*Primary Examiner* — Karl D Frech
(74) *Attorney, Agent, or Firm* — Alan M. Weisberg; Christopher & Weisberg, P.A.

(57) ABSTRACT

A radio frequency identification, RFID, security system tag is provided. The tag includes an RFID element and a first housing portion. The first housing portion defines an interior and an opening. The interior of the first housing portion includes an inner periphery and a shelf disposed about at least a portion of the inner periphery. The interior of the first housing portion also includes a plurality of protrusions in which the plurality of protrusions extend outwardly from the shelf toward the opening. The RFID element is disposed at least in part on the plurality of protrusions.

19 Claims, 6 Drawing Sheets

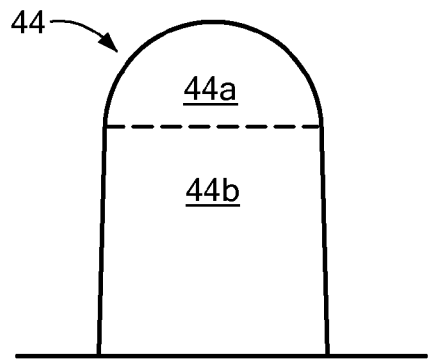
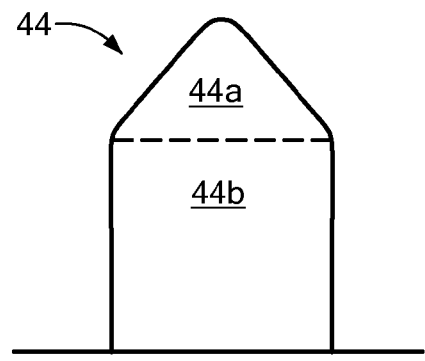
FIG. 10  FIG. 11
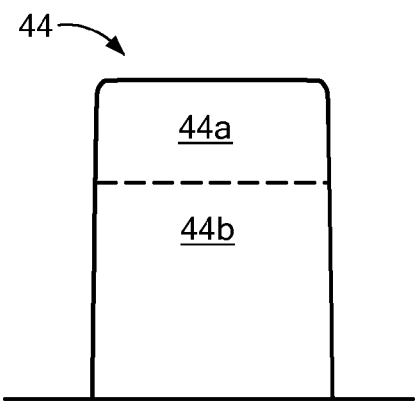
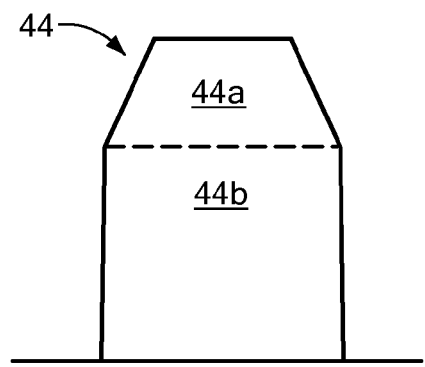
FIG. 12  FIG. 13

RADIO FREQUENCY ID TAG HAVING
STRUCTURE FOR INLAY SPACING

CROSS-REFERENCE TO RELATED
APPLICATION

This application is related to and claims priority to U.S. Provisional Application Ser. No. 61/630,494, filed Dec. 13, 2011, entitled RFID TAG AND IMPROVED HOUSING THEREFORE, the entirety of which is incorporated herein by reference.

FIELD OF THE INVENTION

The present invention relates to the field of radio frequency identification (RFID) security tags, and in particular toward minimizing the effects of tag housings on the performance of the RFID inlays contained therein.

BACKGROUND OF THE INVENTION

Wireless communication tags are often found in retail and/or warehouse environments, among other environments. The wireless communication tags may be used to track and identify items such as packages, containers, inventory items and articles for inventory, asset management and/or security purposes.

One type of wireless communication tag is a radio frequency identification (RFID) tag. The RFID tag transmits stored information, e.g., information relating to an item using radio frequency (RF) signals. In particular, the RFID tag may include an inlay with an antenna and integrated circuit (IC) chip disposed thereon in which the IC chip is connected to the antenna. The IC chip stores the programmed information, e.g., the information relating to the item. In response to receiving an interrogation signal from an RFID reader, the IC chip converts the programmed information into a corresponding electromagnetic signal which is transmitted by the antenna. The RFID tag is tuned to receive an interrogation signal at a particular frequency or narrow range of frequencies.

However, the performance of the RFID tag may vary depending on various factors. One factor involves the interaction between the inlay and the plastic housing of the RFID tag. For example, when positioned outside and not in contact with the housing, the antenna may exhibit a specific response to the interrogation signal. Placing the substrate with antenna within the housing of the RFID tag, may alter the frequency response of the antenna such that substantially less of the interrogation signal is captured by the RFID tag, i.e., the RFID tag may not "respond" or will respond poorly to the interrogation signal. The interaction or contact between the substrate and housing results in antenna detuning. Moreover, movement of the substrate within the RFID tag may further vary the interaction between the substrate and housing such as to shift the tuned frequency of the antenna. For example, the RFID tag may be attached to an article that is moved around a store or warehouse such that the substrate with antenna is shifted around within the RFID tag which varies the interaction between the substrate and housing. An RFID tag that has become detuned may be unable to receive the interrogation signal as the antenna is no longer tuned to the interrogation signal. In other words, an RFID reader is unable to read or interrogate the RFID tag, or the reading performance is degraded.

Another factor that affects performance of RFID tags is the housing material. For example, loss of signal or antenna detuning may be caused by the lossy characteristics of the plastic housing materials. Moreover, the variations in the housing materials used by different manufactures may also result in tuning variations. In other words, the housing material itself may detune the RFID tag.

Several solutions have been proposed to help maintain RFID tag performance. One solution is to inhibit movement of the substrate within the RFID tag. For example, the substrate may be glued to the housing or the housing may be constructed with a clip-like structure that firmly presses the substrate against the housing. While this solution reduces movement of the substrate, the interaction between the substrate and housing is likely increased. While the tuned frequency of the RFID tag may not vary due to movement, the increased interaction between substrate and housing may have detuned the antenna, i.e., the RFID tag will likely remain detuned.

Another solution involves reducing the interaction between the antenna and the housing by increasing the housing size. In particular, the size of the housing is increased such that the antenna can be positioned away from the inlay support structure of the housing. However, this solution disadvantageously increases the size of tag such as to increase cost of manufacturing and detracts from the aesthetic appeal of the item to which the tag is attached.

SUMMARY OF THE INVENTION

The present invention advantageously provides a system, device and method for an improved security tag housing.

According to one embodiment, a radio frequency identification, RFID, security system tag is provided. The tag includes an RFID element and a first housing portion. The first housing portion defines an interior and an opening. The interior of the first housing portion includes an inner periphery and a shelf disposed about at least a portion of the inner periphery. The interior of the first housing portion also includes a plurality of protrusions in which the plurality of protrusions extend outwardly from the shelf toward the opening. The RFID element is disposed at least in part on the plurality of protrusions.

According to another embodiment, a security system tag is provided. The tag includes a first housing portion that defines an interior and an opening. The interior of the first housing portion includes an inner periphery and a shelf disposed about at least a portion of the inner periphery. The interior of the first housing portion also includes a plurality of protrusions in which the plurality of protrusions extend outwardly from the shelf toward the opening.

According to another embodiment, a method is provided. A security tag is attached to an article. The security tag includes a radio frequency identification, RFID, element and a housing portion. The housing portion defines an interior and an opening. The interior of the housing portion includes an inner periphery and a shelf disposed about at least a portion of the inner periphery. The interior of the housing portion includes a plurality of protrusions in which the plurality of protrusions extend outwardly from the shelf toward the opening. The RFID element is disposed at least in part on the plurality of protrusions.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 10 illustrates a side view of a protrusion constructed in accordance with the principles of the present invention;

FIG. 11 illustrates a side view of another protrusion constructed in accordance with the principles of the present invention;

FIG. 12 illustrates a side view of yet another protrusion constructed in accordance with the principles of the present invention;

FIG. 13 illustrates a side view of still yet another protrusion constructed in accordance with the principles of the present invention.

DETAILED DESCRIPTION OF THE INVENTION

Figure 1:
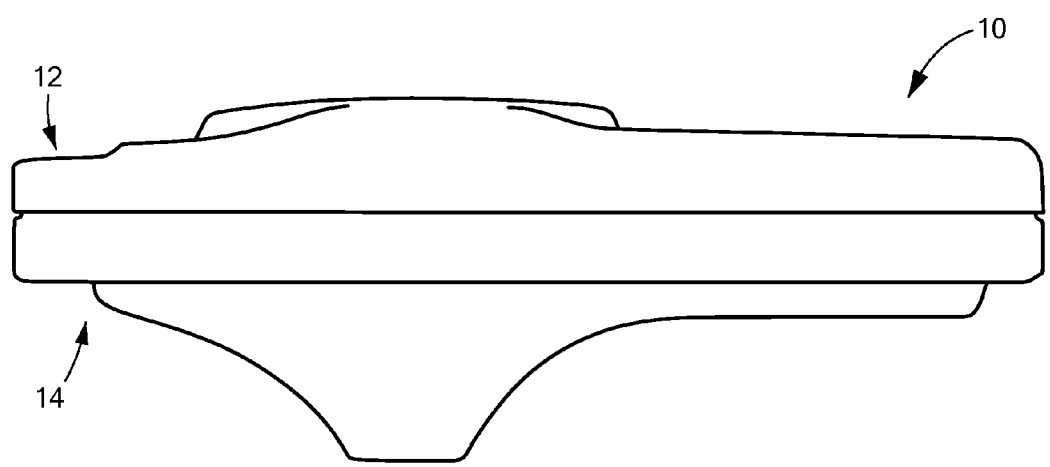
FIG. 1 illustrates a side view of an exemplary security tag system constructed in accordance with the present invention.

The present invention advantageously provides a system, device and method for radio frequency identification (RFID) tags. Accordingly, the system, device and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Referring now to the drawing figures in which like reference designators refer to like elements there is shown in FIG. 1 a side view of an exemplary security tag system constructed in accordance with the principles of the present invention and designated generally as "10." System 10 includes a first housing portion 12 that may be shaped to mate with a tag detaching mechanism (not shown). First housing portion 12 may be molded from a polymer and/or another rigid material or materials. System 10 also includes a second housing portion 14 that may be shaped to mate with the detaching mechanism. Second housing portion 14 may be molded from a polymer and/or another rigid material or materials. For example, first housing portion 12 and/or second housing portion 14 may be made from hard plastic such as an injection molded Acrylonitrate-Butadiene-Styrene (ABS) plastic or other plastic such as a polycarbonate. First housing portion 12 and second housing portion 14 are conjoining parts that may be affixed to each other via ultrasonic welding and/or snap fitting, among other joining mechanisms known in the art. When conjoined, the first and second portions may define a volume.

Figure 2:
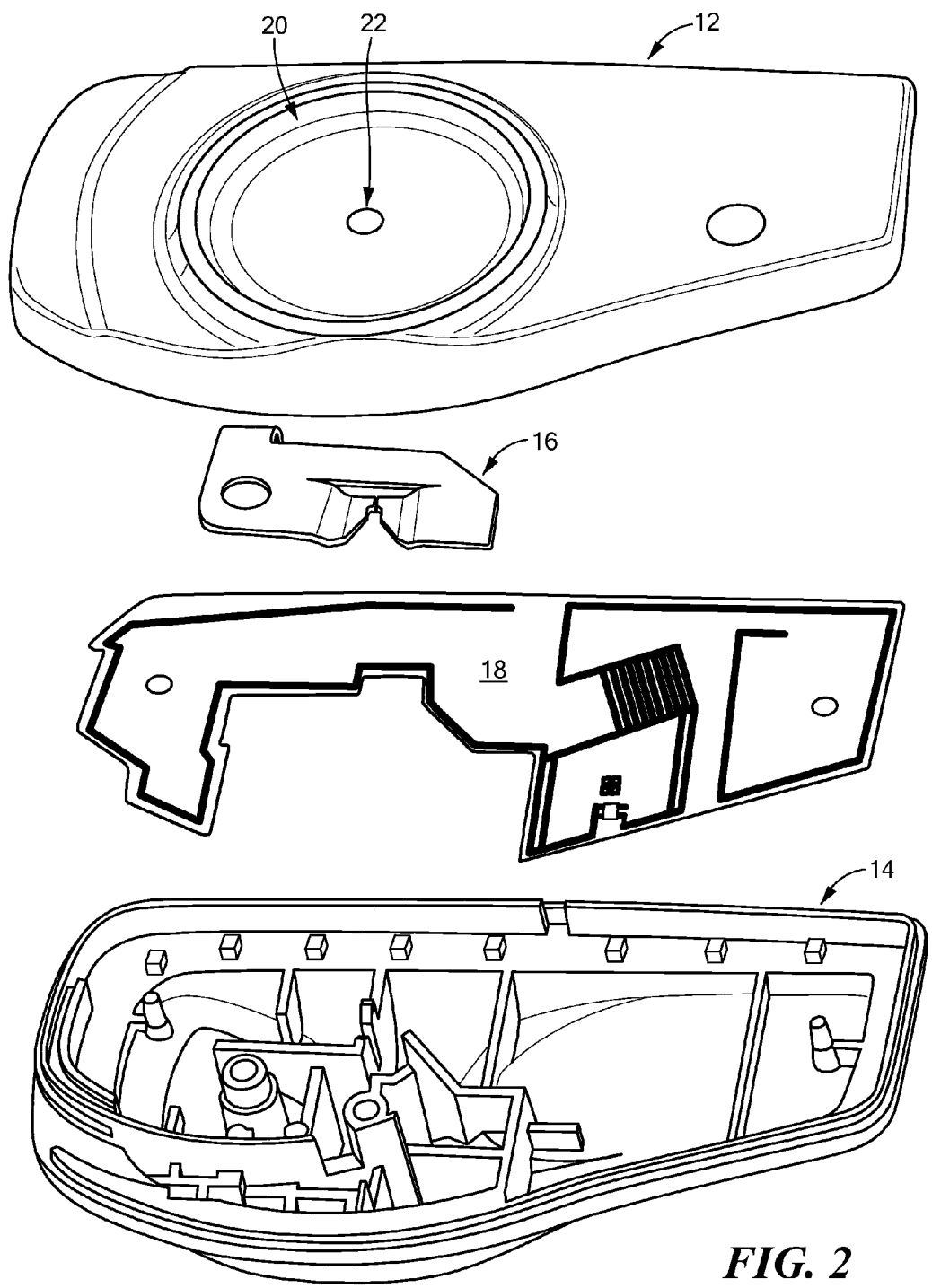
FIG. 2 illustrates an exploded view of the security tag system constructed in accordance with the present invention.

Referring to FIG. 2, an exploded view of system 10 is provided in accordance with the principles of the present invention. System 10 includes first housing portion 12, second housing portion 14, clamp 16 and/or inlay 18, among other components discussed in detail below. First housing portion 12 may include cavity 20 that may be shaped to receive a detachable security element, e.g., locking pin or tack (not shown). First housing portion 12 may include aperture 22 that is configured to allow removable insertion of detachable security element into first housing portion 12. The detachable security element may be a locking pin or tack, among other detachable security elements that may be removably engaged with clamp 16.

Second housing portion 14 is discussed in detail below with reference to FIG. 5. When conjoined or mated, the first and second portions define a volume. Clamp 16 is configured to removably engage detachable security element. Clamp 16 is shaped to mate with second housing portion 14 and may be positioned within the interior or inner area defined by second housing portion 14, i.e., clamp 16 is disposed within the volume defined by the mated first and second portions. Clamp 16 may be made out metal and/or plastic, among other materials known in the art.

Inlay 18 is an insert that is configured to be disposed within the interior of second housing portion 14 or within the volume defined by the mated first and second portions. Inlay 18 may be an RFID inlay (also referred to as an "RFID element") as is discussed in detail with respect to FIG. 4. Inlay 18 may be shaped to fit within interior or inner area of second housing portion 14 as discussed in detail below with reference to FIG. 6. While positioned within the interior of second housing portion 14, inlay 18 may be substantially secured in place by first housing portion 12 and/or second housing portion 14, among other elements. Inlay 18 may be rigid, semi-rigid or flexible based at least in part on the materials used to create inlay 18 and/or design need, among other factors. One of ordinary skill in the art will recognize that other insert shapes and/or materials may be used without detracting from the spirit and scope of the invention.

Figure 3:
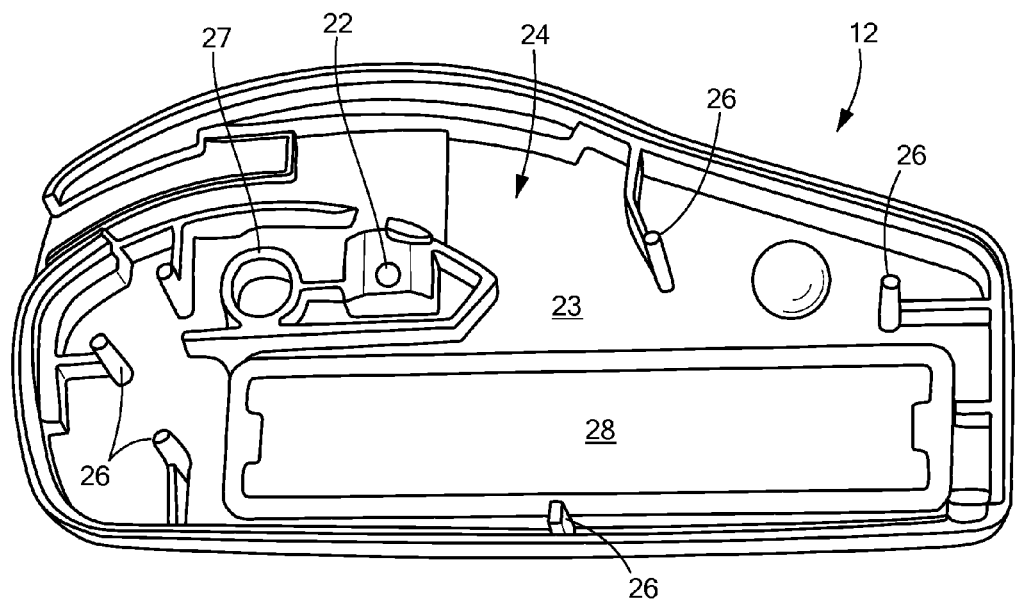
FIG. 3 illustrates a perspective view of a first housing portion of the security tag constructed in accordance with the present invention.

An upper perspective view of first housing portion 12 of security system tag 10 is described with reference to FIG. 3. First housing portion 12 includes interior surface 23 and interior area 24 in which interior area 24 is defined at least in part by the periphery of first housing portion 12. First housing portion 12 may include aperture 22 configured to allow a detachable security element to be removably inserted therein. First housing portion 12 may include one or more constraining posts 26. Constraining posts 26 may be configured to constrain the movement of inlay 18 when inlay 18 is disposed within the interior of second housing portion 14, and when first housing portion 12 and second housing portion 14 are conjoined. In particular, constraining posts 26 may be configured to press at least a portion of inlay 18 against shelf 42 (FIG. 5), protrusion 44 (FIG. 5) and/or other portions of second housing portion 14 such that movement of inlay 18 in a direction substantially perpendicular to shelf 42 is reduced. Constraining post 26 may be configured not to physically contact at least antenna 30 (FIG. 5) and/or IC chip 34 (FIG. 5) when first housing portion 12 is mated with second housing portion 14 and when inlay 18 is disposed at least in part on protrusion 44. While the shape of constraining posts 26 are shown as being substantially cylindrical and/or rectangular, other shapes may be incorporated based at least in part on design need, among other design considerations. First housing portion 12 may include retainer 27 that is configured to mate with mating element 50, discussed in detail with respect to FIG. 5.

An electronic article surveillance (EAS) element 28 may be disposed within the interior area of first housing portion 12. In particular, EAS element may be sized to fit within the interior area of first housing portion 12. EAS element 28 may be removably affixed to one or more surfaces of first housing portion 12 via adhesive, among other methods known in the art, e.g., EAS element 28 may be removably affixed to interior surface 23. The EAS element 28 may be an acoustomagnetic EAS element, among other EAS elements known in the art.

Figure 4:
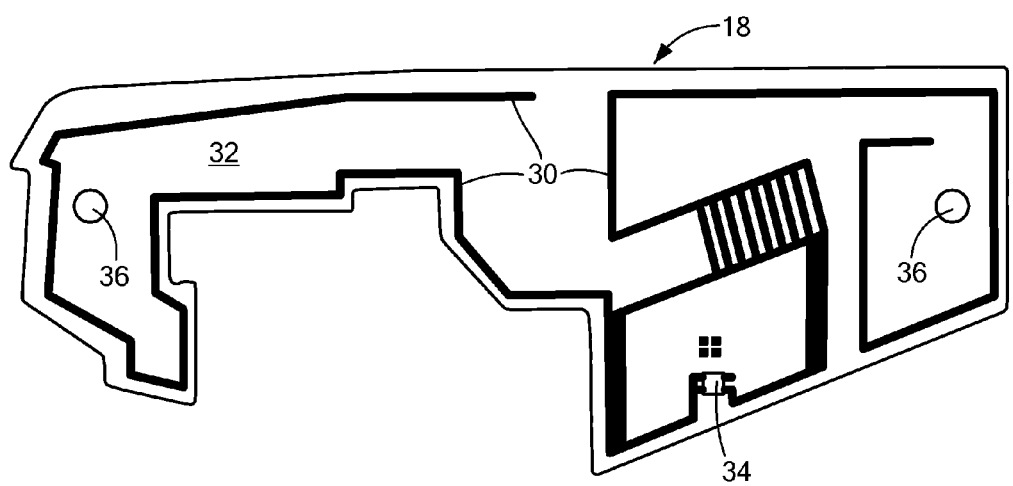
FIG. 4 illustrates a top view of an inlay constructed in accordance with the present invention.

A top view of inlay 18 is described with reference to FIG. 4. Inlay 18 may be an RFID inlay that responds to an RFID interrogation signal. Inlay 18 includes substrate 32 and antenna 30 disposed on substrate 32. Antenna 30 is configured to receive and transmit radio frequency signals. In particular, antenna 30 has a pattern of conductive material etched on a substrate 32. Antenna 30 may be positioned substantially along the periphery of inlay 18. Antenna 30 may be a dipole antenna or loop antenna, among other antennas known in the art. Inlay 18 may include integrated circuit ("IC") chip 34 disposed thereon and in electrical communication with antenna 30. IC chip 34 may store data associated with an item or article, among other information. Inlay 18 may include one or more inlay apertures 36 that are configured to mate with posts 46 on second housing portion 14, as described in detail with respect to FIG. 5. Inlay 18 surface may include indentations (not shown) configured to mate with protrusion 44, thereby helping reduce movement of inlay 18.

Figure 5:
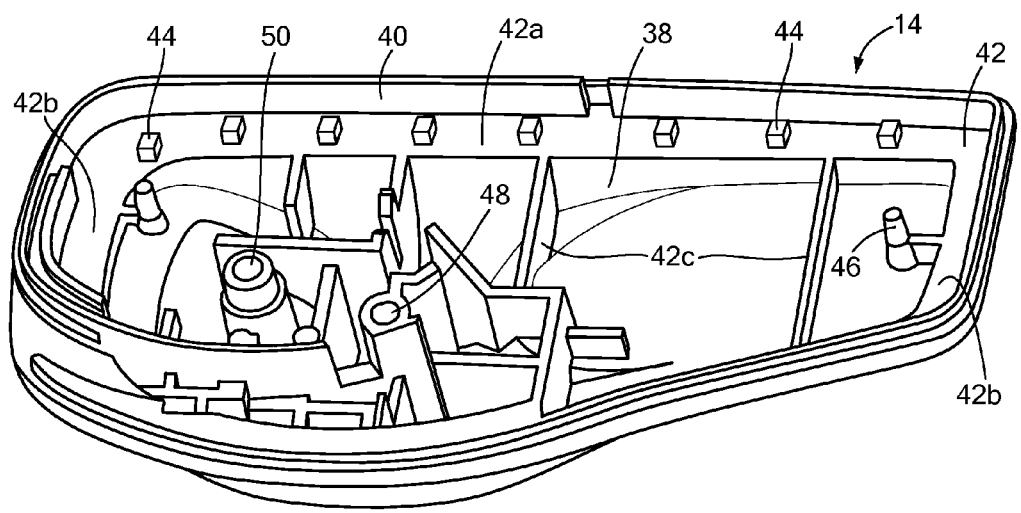
FIG. 5 illustrates a perspective view of a second housing portion of the security tag constructed in accordance with the present invention.

Referring to FIG. 5, a perspective view of second housing portion 14 is described. Second housing portion 14 may include opening 40 and interior area 38 defined at least in part by the outer periphery of second housing portion 14. Second housing portion 14 may include shelf 42 positioned along at least a portion of the periphery of second housing portion 14. Shelf 42 may include at least first segment 42a, second segment(s) 42b and third segment(s) 42c in which second segment 42b and/or third segment 42c are substantially perpendicular to first segment 42a. First segment 42a and second segment 42b may be positioned along at least a portion of the periphery of second housing portion 14. Third segment 42c may be positioned in between and substantially parallel to second segment 42b. First segment 42a, second segment 42b and third segment 42c may provide, at least in part, a support structure for inlay 18. First segment 42a, second segment 42b and third segment 42c may have respective lengths and widths in which the length of first segment 42a may be greater than the length of second segment 42b and/or third segment 42c. One of ordinary skill in the art will understand that shelf 42 may be composed of one or more segments. Alternatively, the one or more segments may be separate or detached from shelf 42.

Second housing portion 14 may include one or more protrusions 44 disposed at least in part on a portion of shelf 42. A protrusion 44 may extend outwardly from shelf 42 towards opening 40 such that protrusion 44 is substantially perpendicular to shelf 42. Protrusion 44 may have a height defined by an amount protrusion 44 extends from shelf 42 as discussed in detail below with respect to FIGS. 8-9. While protrusion 44 is shown having a cube-like or rectangular prism-like shape, protrusion 44 may have other shapes such as a cylindrical or cone shape.

Protrusion 44 is configured to space inlay 18 from at least a portion of shelf 42 such that the interaction and/or physical contact between inlay 18 and shelf 42 is reduced, i.e., antenna 30 is spaced apart from shelf 42. Protrusion 44 may be formed as part of second housing portion 14 or may be a separate element attached to shelf 42. Protrusion 44 may be disposed on shelf 42 in a periodic and/or non-periodic manner. In one embodiment, protrusion 44 is disposed along first segment 42a of shelf 42 while no protrusions are disposed along second segment 42b. The number of protrusions 44 disposed on shelf 42 may vary depending on design.

Second housing portion 14 may include one or more posts 46 configured to engage inlay 18. When engaged with inlay 18, post 46 may reduce movement of inlay 18 in a direction substantially perpendicular to post 46 or parallel to shelf 42. Second housing portion 14 may include mating element 50 arranged to engage clamp 16 and receptacle 27. Second housing portion 14 may include receptacle 48 that is arranged to receive the detachable security element. Receptacle 48 may substantially align with aperture 22. For example, when first housing portion 12 and second housing portion 14 are conjoined, the detachable security element may be removably inserted through aperture 22 and received by receptacle 48 such that movement of detachable security element in a direction perpendicular receptacle 48 is reduced.

Figure 6:
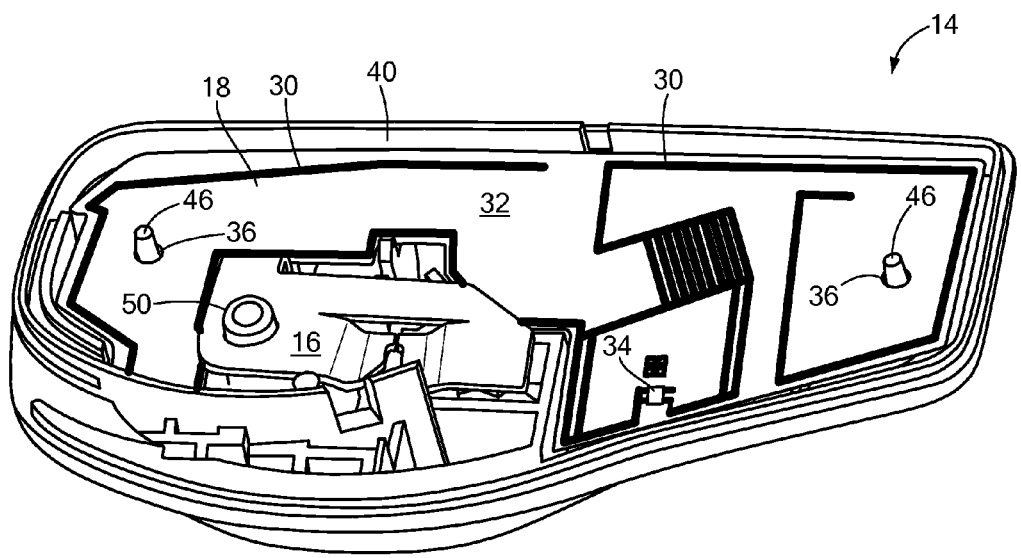
FIG. 6 illustrates a perspective view of part of the security tag system constructed in accordance with the present invention.

A perspective view of second housing portion 14 engaged with clamp 16 and inlay 18 is described with reference to FIG. 6. Inlay 18 is positioned within the interior of second housing portion 14 such that inlay apertures 36 engage with posts 46. Inlay 18 is in contact with shelf 42 and protrusion 44. In particular, protrusion 44 reduces the interaction and/or physical contact between inlay 18, i.e., antenna 30, and first segment 42a of shelf 42 such that the desired tuned frequency of inlay 18 is substantially maintained. For example, reducing the interaction between first segment 42a and inlay 18 may prevent the read frequency of inlay 18 from shifting by 15-20 MHz when contained by first and second housing portions, i.e., substantially maintains the read frequency of inlay 18. Alternatively, the interaction between first segment 42a and inlay 18 may substantially maintain the read frequency of inlay 18 between a first frequency such as 850 MHz and a second frequency such as 950 MHz. Interaction and/or physical contact between inlay 18 and second segment 42b of shelf 42 may not substantially alter the tuned frequency of inlay 18 such that protrusions are not needed on second segment 42b and/or other segments of shelf. The outer perimeter of the shelf may substantially conform to an outer perimeter of the RFID inlay 18. Clamp 16 is engaged with mating element 50 and may be positioned such that at least a portion of clamp 16 overlaps inlay 18.

Figure 7:
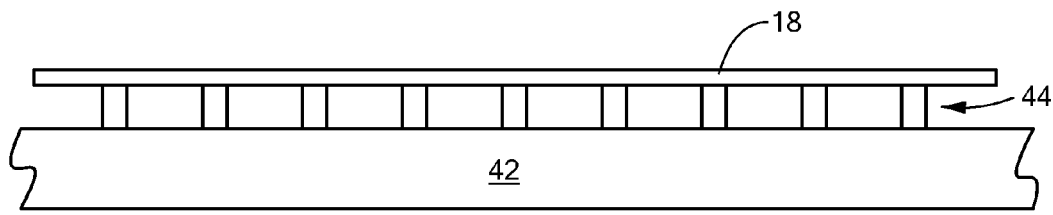
FIG. 7 illustrates a cross-sectional view of part of the security tag system constructed in accordance with the present invention.

Referring to FIG. 7, a cross-sectional view of a portion of second housing portion 14 with inlay 18 disposed thereon is described. Protrusion 44 may space inlay 18 from shelf 42 such that the interaction between inlay 18 and shelf 42 is reduced, i.e., the interaction between antenna 30 and shelf 42 is reduced by spacing antenna 30 or inlay 18 apart from shelf 42 via protrusion 44. While inlay 18 is shown as being substantially planar, one of ordinary skill in the art will recognize that inlay 18 may be composed of a thin flexible substrate that may not lay flat on one or more protrusions 44. The distance between protrusion 44 and the number of protrusions 44 may be varied based on design need, among other factors.

Figure 8:
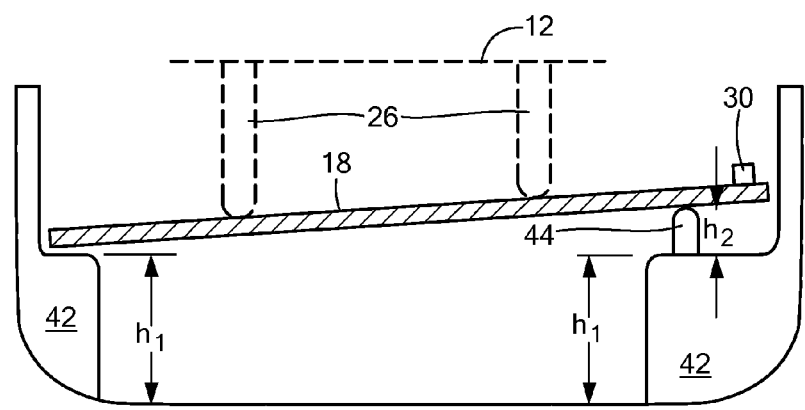
FIG. 8 illustrates another cross-sectional view of part of the security tag system constructed in accordance with the present invention.

Referring to FIG. 8, a cross-sectional view of second housing portion 14 and inlay 18 disposed thereon is illustrated.

Shelf 42 has a height h1 extending above a bottom surface of second housing portion 14. Protrusions 44 have height h2 extending above the shelf 42 such that the height h2 of each protrusion is configured to substantially maintain a predetermined read frequency of RFID inlay 18 when RFID inlay 18 is disposed at least in part on the plurality of protrusions. Inlay 18 is disposed on shelf 42 and protrusions 44 such that the physical and electrical interaction between inlay 18 and shelf 42 is reduced. At least a portion of antenna 30 may overlap, but be spaced away from, shelf 42. Overlapping at least a portion of antenna 30 and inlay 18 with shelf 42 allows the size of first and second housing portions to be kept to a minimum while still reducing the interaction between shelf 42 and inlay 18.

While at least a portion of antenna 30 is illustrated in FIG. 8 as being offset from protrusions 44, at least a portion of antenna 30 may alternatively be configured to overlap at least a portion of protrusions 44. Constraining post 26 may press inlay 18 against shelf 42 and protrusions 44 such as to reduce movement of inlay 18 in a direction substantially parallel to protrusions 44 and/or constraining post 26, or in a direction substantially perpendicular to shelf 42. For purposes of clarity, other portions of shelf 42, first housing portion 12 and/or second housing portion 14 have been omitted from FIG. 8.

Figure 9:
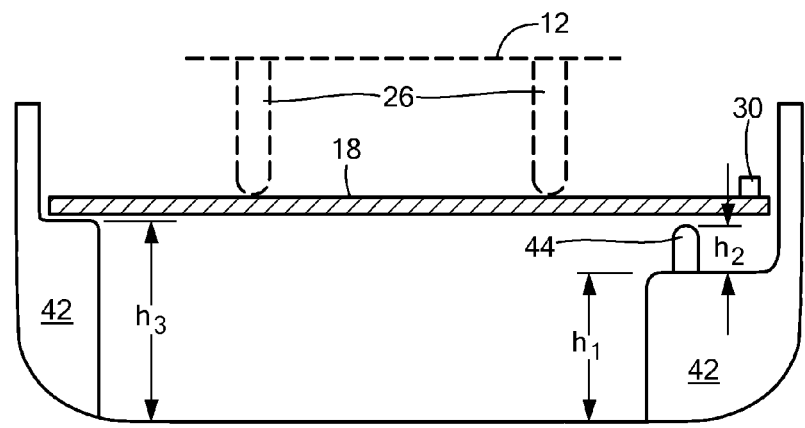
FIG. 9 illustrates a cross-sectional view of part of another embodiment of the security tag system constructed in accordance with the present invention.

Referring to FIG. 9, a cross-sectional view of another embodiment including second housing portion 14 and inlay 18 disposed thereon is provided in accordance with the principles of the prevent invention. FIG. 9 substantially corresponds to elements in FIG. 8 except that the height of shelf 42 on one side of second housing portion 14 is lower than the shelf height on a different side of second housing portion 14. For example, one side of second housing portion 14 such as segment 42b may have a shelf height of h3 while another side such as segment 42a, e.g., distal side, may have a shelf height of h1. Protrusions 44 are disposed on shelf 42 having a height h2. The height of protrusion 44 may vary such as between 0.05 to 0.5 millimeter (mm), among other values based on design need. One of ordinary skill in the art will recognize that other height configurations may be implemented depending on manufacturing, cost considerations, overall size of system 10, size of inlay 18 and/or positioning of other components within system 10, among other factors.

As with the embodiment of FIG. 8, the inlay 18 of FIG. 9 is configured such that at least a portion of antenna 30 is spaced from shelf 42 by protrusions 44. In particular, at least a portion of antenna 30 may overlap as least a portion of shelf 42 such as first segment 42a. While at least a portion of antenna 30 is illustrated in FIG. 9 as being offset from protrusions 44, at least a portion of antenna 30 may alternatively be configured to overlap, at least in part, one of more protrusions 44.

Referring to FIG. 10, an exemplary side view of protrusion 44 is illustrated. Protrusion 44 has tip segment 44a and body segment 44b. Tip segment 44a may be distal to shelf 42 and may have one or more shapes such as a substantially geometric shape. For example, tip segment 44a may have a substantially hemisphere shape. An exemplary side view of another embodiment of protrusion 44 is shown in FIG. 11. Tip segment 44a and body segment 44b may substantially correspond to similar portions in FIG. 10 except that tip segment 44a may have a substantially pyramid shape. FIG. 12 illustrates a side view of another embodiment of protrusion 44. Tip segment 44a and body segment 44b may substantially correspond to similar segments in FIG. 10 except that tip segment 44a may have a substantially rectangular prism shape. FIG. 13 is a side view of another embodiment of protrusion 44. Protrusion 44 may have a tip segment 44a and body segment 44b that substantially correspond to similar segments in FIG. 10 with the exception that tip segment 44a is illustrated in FIG. 13 as having a trapezoidal shape.

While tip segment 44a, illustrated in FIGS. 10-13, is shown having a particular shape, tip segment 44a may have other shapes geometric and/or non-geometric. The shape of each protrusion 44, illustrated in FIG. 5 may have substantially the same tip segment 44a shape as each other. Alternatively, the shape of tip segments 44a may be varied depending on design need. Body segment 44b may have one or more shapes such as a substantially rectangular shape or cylindrical shape, among other shapes. One or ordinary skill in the art at the time of invention will understand that protrusion 44 may be composed of one or more segments.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A radio frequency identification (RFID) security system tag, comprising:
   an RFID element; and
   a first housing portion, the first housing portion defining an interior and an opening, the interior of the first housing portion including:
      an inner periphery;
      a plurality of protrusions disposed about the inner periphery, the plurality of protrusions extending toward the opening, the RFID element being disposed at least in part on the plurality of protrusions;
   a second housing portion, the second housing portion being configured to mate with the first housing portion, the second housing portion defining a second opening, the second housing portion including:
      an interior surface; and
      a plurality of posts, the plurality of posts extending outwardly from the interior surface towards the opening, the plurality of posts being configured to press against the RFID element when the first housing portion is mated with the second housing portion and when the RFID element is disposed at least in part on the plurality of protrusions.

2. The RFID security system tag of claim 1, wherein the first housing portion further comprises a shelf disposed about at least a portion of the inner periphery, wherein the plurality of protrusions extend outwardly from the shelf toward the opening, and wherein an outer perimeter of the shelf substantially conforms to an outer perimeter of the RFID element.

3. The RFID security system tag of claim 2, wherein the shelf is defined at least in part by a first segment and a second segment substantially perpendicular to the first segment, the first segment having a length greater than the second segment, the plurality of protrusions being disposed on the first segment.

4. The RFID security system tag of claim 2, wherein each protrusion of the plurality of protrusions has a tip segment distal to the shelf, the tip segment having a substantially geometric shape.

5. The RFID security system tag of claim 4, wherein the substantially geometric shape is one of a hemisphere shape, pyramid shape and trapezoidal shape.

6. The security system tag of claim 2, wherein the shelf is defined at least by a first segment and a second segment substantially perpendicular to the first segment, the first segment having a length greater than the second segment, the plurality of protrusions being disposed on the first segment.

7. The RFID security system tag of claim 1, wherein the plurality of posts are configured not to physically contact the RFID element when the first housing portion is mated with the second housing portion and when the RFID element is disposed at least in part on the plurality of protrusions.

8. A radio frequency identification (RFID) security system tag, comprising:
an RFID element;
a first housing portion, the first housing portion defining an interior and an opening, the interior of the first housing portion including:
an inner periphery;
a shelf disposed about at least a portion of the inner periphery; and
a plurality of protrusions, the plurality of protrusions extending outwardly from the shelf toward the opening, the RFID element being disposed at least in part on the plurality of protrusions; and
each of the plurality of protrusions has a height, the height of each protrusion being configured to substantially maintain a predetermined read frequency of the RFID element between a first frequency and a second frequency when the RFID element is disposed on the plurality of protrusions.

9. The RFID security system tag of claim 8, wherein the first frequency is 850 Megahertz (MHz) and the second frequency is 950 MHz.

10. A radio frequency identification (RFID) security system tag, comprising:
an RFID element;
a first housing portion, the first housing portion defining an interior and an opening, the interior of the first housing portion including:
an inner periphery;
a shelf disposed about at least a portion of the inner periphery; and
a plurality of protrusions, the plurality of protrusions extending outwardly from the shelf toward the opening, the RFID element being disposed at least in part on the plurality of protrusions; and
the RFID element having a substrate and an antenna disposed on the substrate, at least a portion of the antenna overlapping the shelf and being spaced apart from the shelf at least in part by the plurality of protrusions.

11. The RFID security system tag of claim 10, further comprising:
a second housing portion defining a second interior, the second housing portion being configured to mate with the first housing portion, the first and second housing portions defining a volume when mated;
an electronic article surveillance (EAS) element, the EAS element being disposed within the volume; and
the RFID element being disposed within the volume.

12. The security system tag of claim 10, further comprising a second housing portion, the second housing portion being configured to mate with the first housing portion, the second housing portion defining a second opening, the second housing portion including:
an interior surface; and
a plurality of posts, the plurality of posts extending outwardly from the interior surface towards the opening, the plurality of post being configured to press against the RFID element when the first housing portion is mated with the second housing portion and when the RFID element is disposed at least in part on the plurality of protrusions.

13. The security system tag of claim 12, wherein the plurality of posts are configured not to physically contact the antenna when the first housing portion is mated with the second housing portion and when the RFID element is disposed at least in part on the plurality of protrusions.

14. The security system tag of claim 12, wherein an outer perimeter of the shelf substantially conforms to an outer perimeter of the RFID element.

15. The security system tag of claim 12, wherein each protrusion of the plurality of protrusions has a tip segment distal to the shelf, the tip segment having a substantially geometric shape.

16. The security system of tag of claim 10, wherein the shelf is defined at least in part by a first segment and a second segment substantially perpendicular to the first segment, the first segment having a length greater than the second segment, the plurality of protrusions being disposed on the first segment.

17. A method, comprising:
attaching a security tag to an article, the security tag including:
a radio frequency identification (RFID) element; and
a first housing portion, the first housing portion defining an interior and an opening, the interior of the first housing portion including:
an inner periphery;
a plurality of protrusions disposed about the inner periphery, the plurality of protrusions extending outwardly toward the opening, the RFID element being disposed at least in part on the plurality of protrusions;
a second housing portion, the second housing portion being configured to mate with the first housing portion, the second housing portion defining a second opening, the second housing portion including:
an interior surface; and
a plurality of posts, the plurality of posts extending outwardly from the interior surface towards the opening, the plurality of post being configured to press against the RFID element when the first housing portion is mated with the second housing portion and when the RFID element is disposed at least in part on the plurality of protrusions.

18. A method, comprising:
attaching a security tag to an article, the security tag including:
a radio frequency identification (RFID) element; and
a housing portion, the housing portion defining an interior and an opening, the interior of the housing portion including:
an inner periphery;
a shelf disposed about at least a portion of the inner periphery; and
a plurality of protrusions, the plurality of protrusions extending outwardly from the shelf toward the opening, the RFID element being disposed at least in part on the plurality of protrusions;
the RFID element has an antenna, at least a portion of the antenna overlapping the shelf and being spaced apart from the shelf at least in part by the plurality of protrusions.

19. The method of claim 18, wherein each protrusion of the plurality of protrusions has a tip segment distal to the shelf, the tip segment having one of a hemisphere shape, pyramid shape and trapezoidal shape.

* * * * *